(12) United States Patent  (10) Patent No.: US 9,030,606 B2
Campbell  (45) Date of Patent: May 12, 2015

(54) WIRELESS CAMERA HOUSING ILLUMINATORS

(71) Applicant: GoPro, Inc., San Mateo, CA (US)

(72) Inventor: Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 25 days.

(21) Appl. No.: 13/829,377

(22) Filed: Mar. 14, 2013

(65) Prior Publication Data

US 2014/0267894 A1    Sep. 18, 2014

(51) Int. Cl.
*H04N 5/225* (2006.01)
*H04N 5/222* (2006.01)
*G03B 17/18* (2006.01)

(52) U.S. Cl.
CPC ...................................... *G03B 17/18* (2013.01)

(58) Field of Classification Search
USPC ................................. 348/373–376; 362/23.07
See application file for complete search history.

(56) References Cited

U.S. PATENT DOCUMENTS

| | | | |
|---|---|---|---|
| 6,982,046 B2 * | 1/2006 | Srivastava et al. ..... | 252/301.4 R |
| 7,575,349 B2 * | 8/2009 | Bucher et al. ................ | 362/503 |
| 7,710,457 B2 * | 5/2010 | Schnell ..................... | 348/208.14 |
| 8,059,096 B2 * | 11/2011 | Lim et al. ....................... | 345/169 |
| 2001/0026449 A1 | 10/2001 | Wiggerman et al. .......... | 362/276 |
| 2006/0066753 A1 * | 3/2006 | Gennetten et al. ............ | 348/375 |
| 2006/0072319 A1 * | 4/2006 | Dziekan et al. ............... | 362/249 |
| 2006/0091779 A1 * | 5/2006 | Takeda et al. ................. | 313/487 |
| 2006/0181639 A1 * | 8/2006 | Ueda et al. ..................... | 348/376 |
| 2006/0193614 A1 * | 8/2006 | Watanabe et al. ............... | 396/27 |
| 2006/0209551 A1 * | 9/2006 | Schwenke et al. ............ | 362/503 |
| 2006/0244358 A1 * | 11/2006 | Kim et al. ...................... | 313/486 |
| 2007/0090277 A1 * | 4/2007 | Palmer et al. ........... | 250/214 VT |
| 2008/0192114 A1 * | 8/2008 | Pearson et al. .................. | 348/81 |
| 2010/0008101 A1 * | 1/2010 | Bucher ......................... | 362/565 |
| 2010/0110707 A1 * | 5/2010 | Weindorf ...................... | 362/489 |
| 2010/0253826 A1 * | 10/2010 | Green et al. ................... | 348/335 |
| 2011/0149254 A1 * | 6/2011 | Kotani .......................... | 353/122 |
| 2011/0298970 A1 * | 12/2011 | Shinohara et al. ............ | 348/373 |
| 2012/0120639 A1 * | 5/2012 | Armer et al. .................. | 362/158 |
| 2012/0133758 A1 * | 5/2012 | Foss et al. ........................ | 348/81 |
| 2012/0289203 A1 * | 11/2012 | Santo et al. ................ | 455/412.2 |
| 2013/0162852 A1 * | 6/2013 | Boyle et al. .............. | 348/211.99 |
| 2013/0171754 A1 * | 7/2013 | Zsinko et al. ................... | 438/29 |
| 2013/0171903 A1 * | 7/2013 | Zsinko et al. ................... | 445/58 |
| 2013/0201393 A1 * | 8/2013 | Hubbard ....................... | 348/376 |
| 2014/0092299 A1 * | 4/2014 | Phillips et al. ............... | 348/376 |
| 2014/0152890 A1 * | 6/2014 | Rayner ......................... | 348/376 |
| 2014/0168508 A1 * | 6/2014 | Nunnink et al. .............. | 348/373 |

* cited by examiner

*Primary Examiner* — Chia-Wei A Chen
(74) *Attorney, Agent, or Firm* — Fenwick & West LLP

(57) ABSTRACT

A camera system includes a wireless indicator that emits light to provide signals to a user. This wireless indicator is attached to a lens casing that covers the front face of the camera to protect components of the camera such as the lens. A wireless signal interface on the front face of the camera is configured to emit ultraviolet light in response to control circuitry within the camera. The ultraviolet light is transmitted through the lens casing to an excitable element. The excitable element produces visible light in response to the ultraviolet light. Any re-emitted visible light that travels back towards the camera lens and image sensor is reflected by a reflective layer, which is configured to transmit ultraviolet light while reflecting visible light. Therefore, the wireless indicator does not cause light artifacts or image flaws to appear in images captured by the image sensor.

16 Claims, 7 Drawing Sheets

WIRELESS CAMERA HOUSING ILLUMINATORS

BACKGROUND

1. Technical Field

This disclosure relates to a camera system, and more specifically, to a wireless camera surface illuminator.

2. Description of the Related Art

Digital cameras are increasingly used in outdoors and sports environments. Often, camera housings are required to protect cameras from the elements in such environments. In order to allow camera surface indicators (such as LCD screens and indicator lights) to be visible through a camera housing, the camera housing will often be composed of a transparent or semi-transparent material. Unfortunately, utilizing such materials can result in the reflection of light from the surface indicators within the camera housing and upon the camera lens. The resulting captured images can include various light artifacts or other image flaws as a result of the reflected light.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure 6:
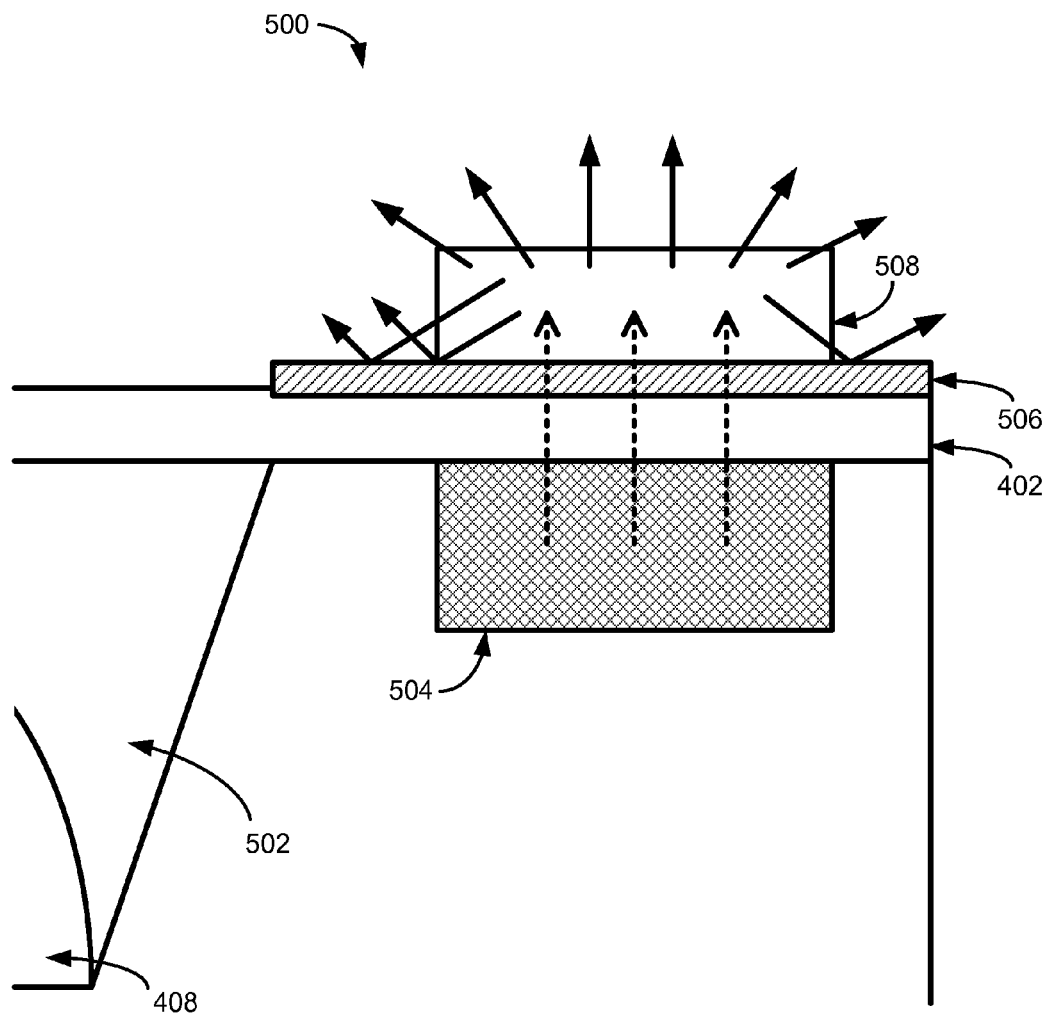

FIG. 6 provides a close-up view of the indicator of a camera with an attached flat front casing, illustrating light flow from a wireless signal interface, through a reflective layer to an excitable element, which emits visible light, according to one example embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body, and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
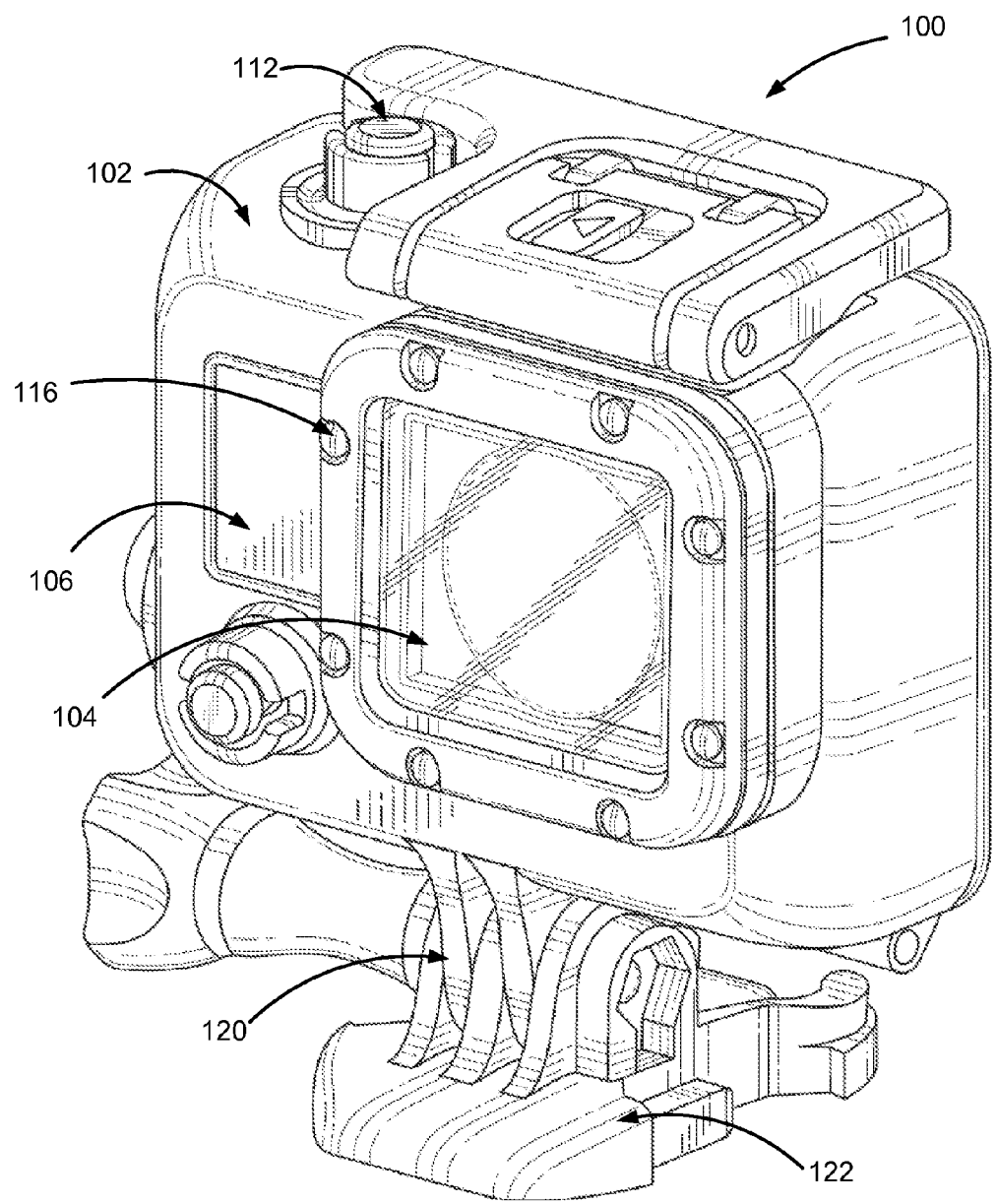
FIG. 1a illustrates a perspective view of a camera system, according to one example embodiment.
Figure 1B:
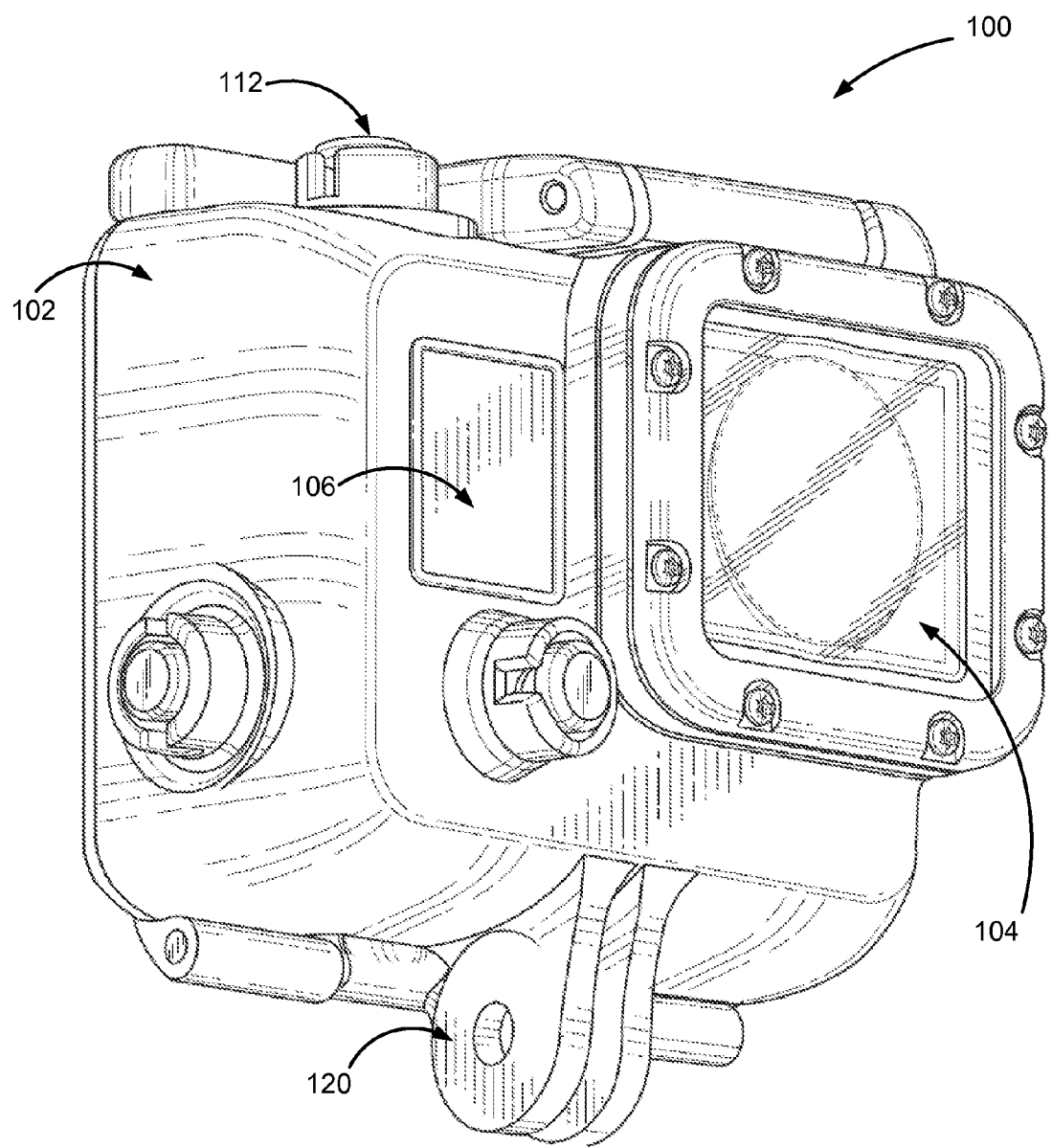
FIG. 1b illustrates another alternative perspective view of a camera system, according to one example embodiment.

FIGS. 1a and 1b illustrate various views of a camera system according to one example embodiment. The camera system includes, among other components, a camera housing 100. In one embodiment, a first housing portion 102 includes a front face with four sides (i.e., a top side, bottom side, left side, and right side) structured to form a cavity that receives a camera (e.g. a still camera or video camera).

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1a illustrates the camera housing secured to a clip-style mount 122. In other embodiments, the camera housing 100 can be secured to a different type of mounting structure.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

In some embodiments described below, instead of including an indicator window 106 structured to substantially align with a camera indicator, the camera housing 100 itself can include indicators controlled by the camera. In such embodiments, the indicator window 106 can include a signal receiving mechanism configured to receive indicator control signals from the camera, and can include a light-emitting mechanism configured to emit light in response to receiving such indicator control signals.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 2:
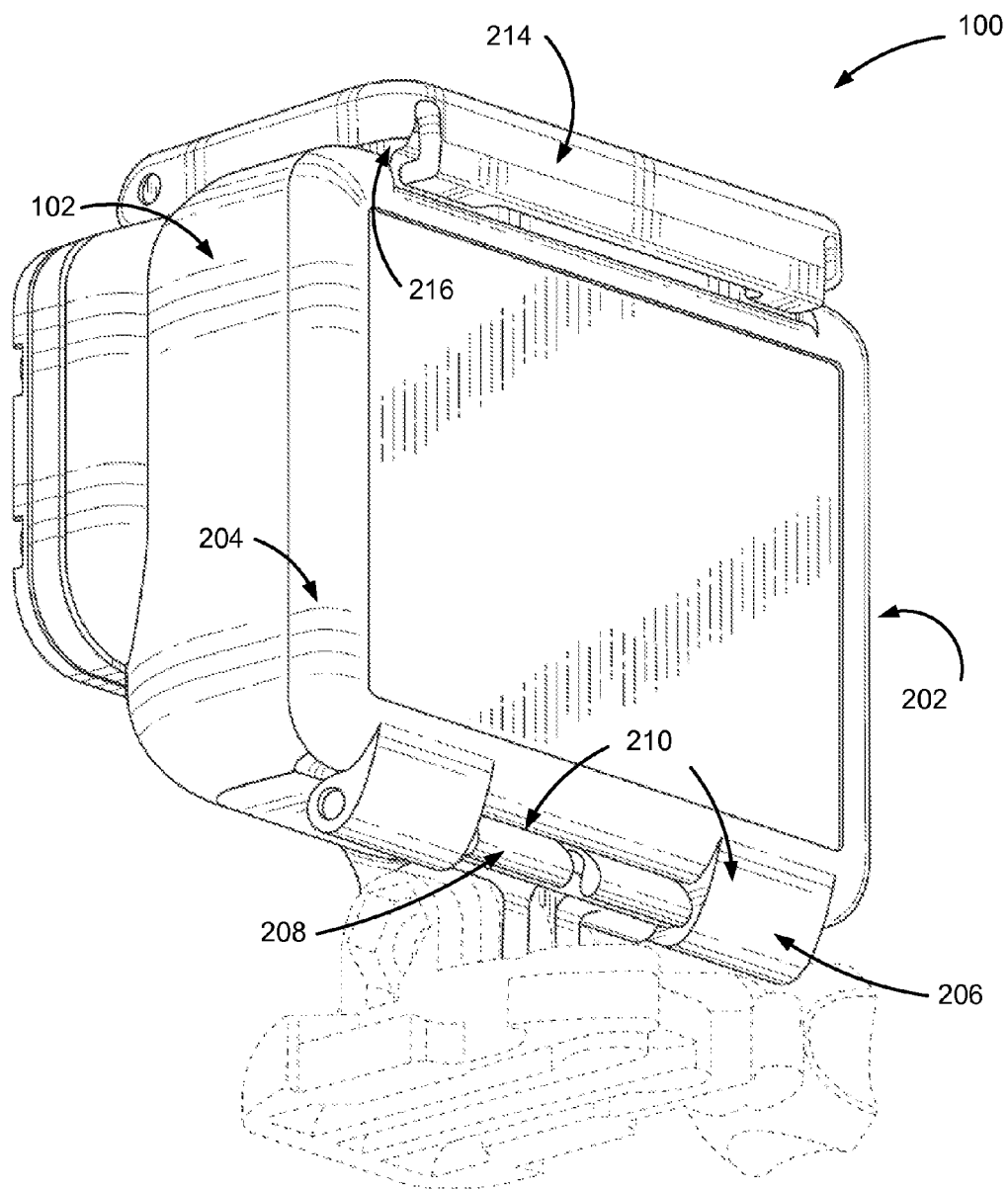
FIG. 2 illustrates a perspective view of a rear of the camera system, according to one example embodiment.

FIG. 2 is a rear perspective view of camera housing 100 illustrating a second housing portion 202, according to one example embodiment. The second housing portion 202 detachably couples with the first housing portion 102 opposite the front face of the first housing portion. The first housing portion 102 and second housing portion 202 are collectively structured to enclose a camera within the cavity when the second housing portion 202 is secured to the first housing portion 102 in a closed position.

In one embodiment, the second housing portion 202 comprises a door 204 that allows the camera to be removed from the housing 100. The door 204 pivots around a hinge 210 that allows the door 204 to be opened or shut. In one embodiment, a first fastening structure 214 located on the top face of the camera housing 100 detachably couples to a second fastening structure 216 on the door 204. The fastening structures 214, 216 secure the door 204 to the first portion 102 of the camera housing 100 in a closed position when coupled, as illustrated in FIG. 2. In one embodiment, the fastening structure 214 comprises a hook-shaped lateral bar and the fastening structure 216 comprises an L-shaped bar. The fastening structure 214 can pivot upwards to allow the door 204 to close and can then be pressed down around the fastening structure 216 to hold the door 204 in the closed position. In different embodiments, fastening structures for securing the door 204 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 210 is instead located on the top face of the housing 100 and the fastening structures 214, 216 are instead located on the bottom face of the housing 100. Alternatively, the hinge 210 and fastening structures 214, 216 may be located on opposite side faces of the camera housing 100.

In one embodiment, the housing 100 includes a watertight seal so that the housing 100 is waterproof when the door 204 is shut. For example, in one embodiment, the door 204 includes a sealing structure positioned on interior edges of the door 204. The sealing structure provides a watertight seal between the first portion of the camera housing 102 and the door 204 when the first securing structure 214 on the top face of the camera housing 100 is coupled to the second securing structure 216 on the top edge of the door 204.

In one embodiment, an outer hinge structure 206 on the bottom edge of the second housing portion 202 detachably couples to an inner hinge structure 208 on the bottom edge of the first housing portion 102 to form the hinge 210. For example, in one embodiment, the outer hinge structure 206 comprises one or more hook-shaped protrusions structured to securely fasten to a rod-shaped member of the inner hinge structure 208. Other mechanisms for coupling the second housing portion 202 to the housing 100 may also be used in various alternative embodiments. In other embodiments, the second housing portion 202 may be permanently attached to the first housing portion 102.

Figure 3:
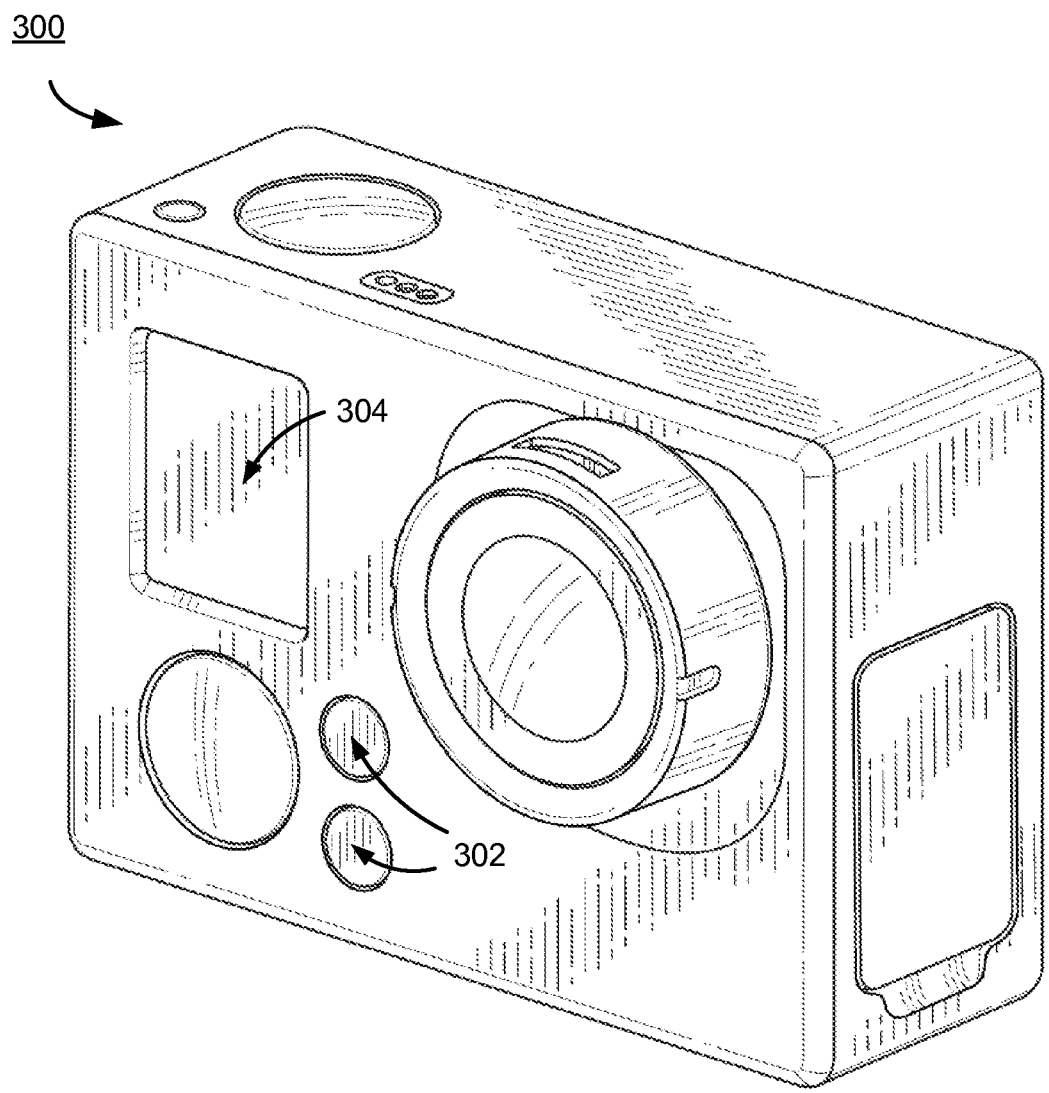
FIG. 3 illustrates a camera for use with the camera system, according to one example embodiment.

FIG. 3 illustrates a camera 300 for use with the camera system, according to one example embodiment. The camera 300 is adapted to fit within the enclosure of the housing 100 discussed above. As illustrated, the camera 300 includes various indicators, including the LED lights 302 and the LED display 304. When the camera 300 is enclosed within the housing 100, the LED display 304 is configured to substantially align with the indicator window 106, and the LED lights 302 are configured to be visible through the housing 100. As will be discussed herein, the LED lights 302 and the LED display 304 can be replaced with signal-emitting mechanisms configured to emit signals that cause indicators on the housing to display visible light in response to receiving such signals.

Wireless Surface Illuminator

Figure 4:
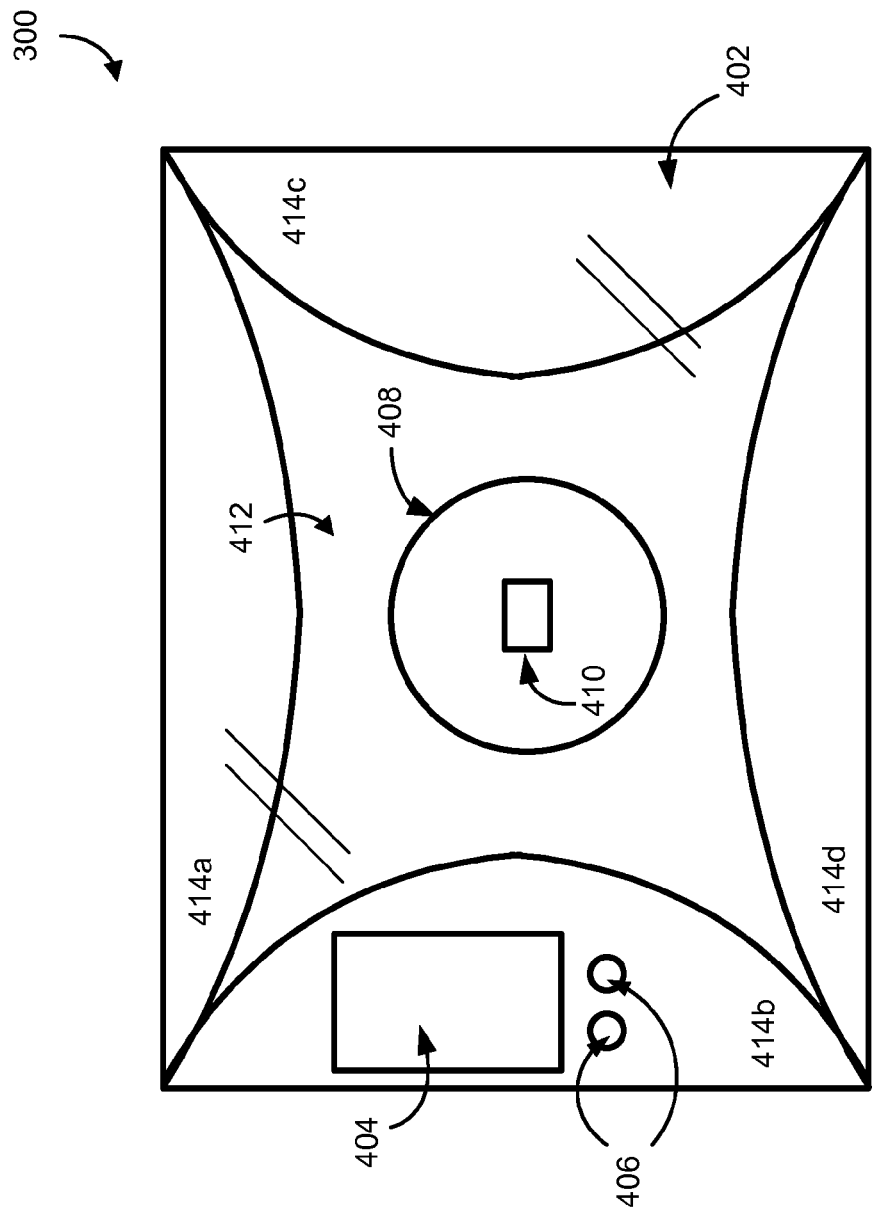
FIG. 4 illustrates a front view of a camera with an attached flat front casing and an indicator, according to one example embodiment.

FIG. 4 illustrates a front view of a camera 300 with an attached flat front casing 402 and a plurality of indicators 404/406, according to one example embodiment. The attached slim form-factor flat lens casing 402 covers the entire front face of the camera (as indicated by oblique lines in FIG. 4), and serves to protect components of the camera, such as the lens 408, from environmental elements. The lens casing 402 may be detachable, or it may be permanently attached to the camera. The lens casing 402 is composed of a transparent or semi-transparent material, which allows light to be transmitted through the lens casing 402. In one embodiment, the lens casing 402 comprises glass. In another embodiment, the lens casing 402 comprises various plastics or polyethylene.

The indicators 404/406 serve as illuminators, and emit visible light. As mentioned previously, an indicator is capable of receiving indicator control signals from the camera 300, and may be configured to emit light in response to receiving such signals. In some embodiments, a camera processor sends indicator control signals to an indicator 404/406 to display visible light to provide signals to a user. For example, an indicator 404/406 may emit light to signify that the camera is recording a video, to signify an amount of remaining battery life, or to signify that an image is about to be captured, among a number of other functions. An indicator 404/406 can also emit light in different colors, intensities of light, or in different pulsation patterns depending on the signal being conveyed. In the example embodiment of FIG. 4, the indicator 404 includes an indicator screen configured to display text, symbols, and/or animations, and the indicators 406 include LEDs configured to emit light in response to various camera functionalities (such as recording video, taking pictures, indicating low battery levels, and indicating camera start-up or shut-down).

Generally, visible light incident upon the image capture region 412 will enter the camera lens 408. The lens 408 may be located anywhere on the front face of the camera 300. In an embodiment, the lens 408 occupies a central region of the front face of the camera 300. In another embodiment, the base of the lens 408 is situated in a recessed channel of the front face of the camera 300. An aperture coupled to the lens 408 can be adjusted to limit the amount of light that is transmitted through the lens 408. Furthermore, an image sensor 410 located underneath the lens 408 is configured to sense the light that is ultimately transmitted through the lens 408 and directed upon the image sensor 410 when an image is captured. During the capture of an image, visible light incident upon the image capture region 412 is directed towards the lens 408, whereas visible light incident upon the area 414a-d outside of the image capture region 412 is not directed towards the lens 408.

The image capture region 412 occupies a region within the front face of the camera. In an embodiment, the image capture region 412 comprises a region of the lens casing 402 that allows for an increased amount of light to be directed into the lens 408. In some embodiments, the edges of the image capture region form two double hyperbolas that are connected at each corner of the front face of the camera 300. In one embodiment, the shape of the image capture region 412 is based on the shape and location of the lens 408, the shape and location of the image sensor 410, or the depth of the lens 408 and/or the image sensor 410 from the lens casing 402 within the camera 300. Alternatively, the shape of the image capture region 412 can be based on any other properties of the camera that affect the ability of light to pass through the lens casing 402 and lens 408 and be captured by the image sensor 410.

Although three indicators 404/406 are shown in the embodiment of FIG. 4, any number or type of indicators 404/406 may be present on the camera 300. The indicators 404/406 can be placed in any region 414a-d outside of the image capture region 412. In another embodiment, the indicators 404/406 are placed in region 414b outside of the image capture region 412. In some embodiments, the indicators 404/406 comprise material that blocks or reflects visible light. This makes it undesirable to place the indicators 404/406 within the image capture region 412, as the indicators 404/406 block light that would otherwise pass through the lens 408 and be captured by the image sensor 410.

Figure 5:
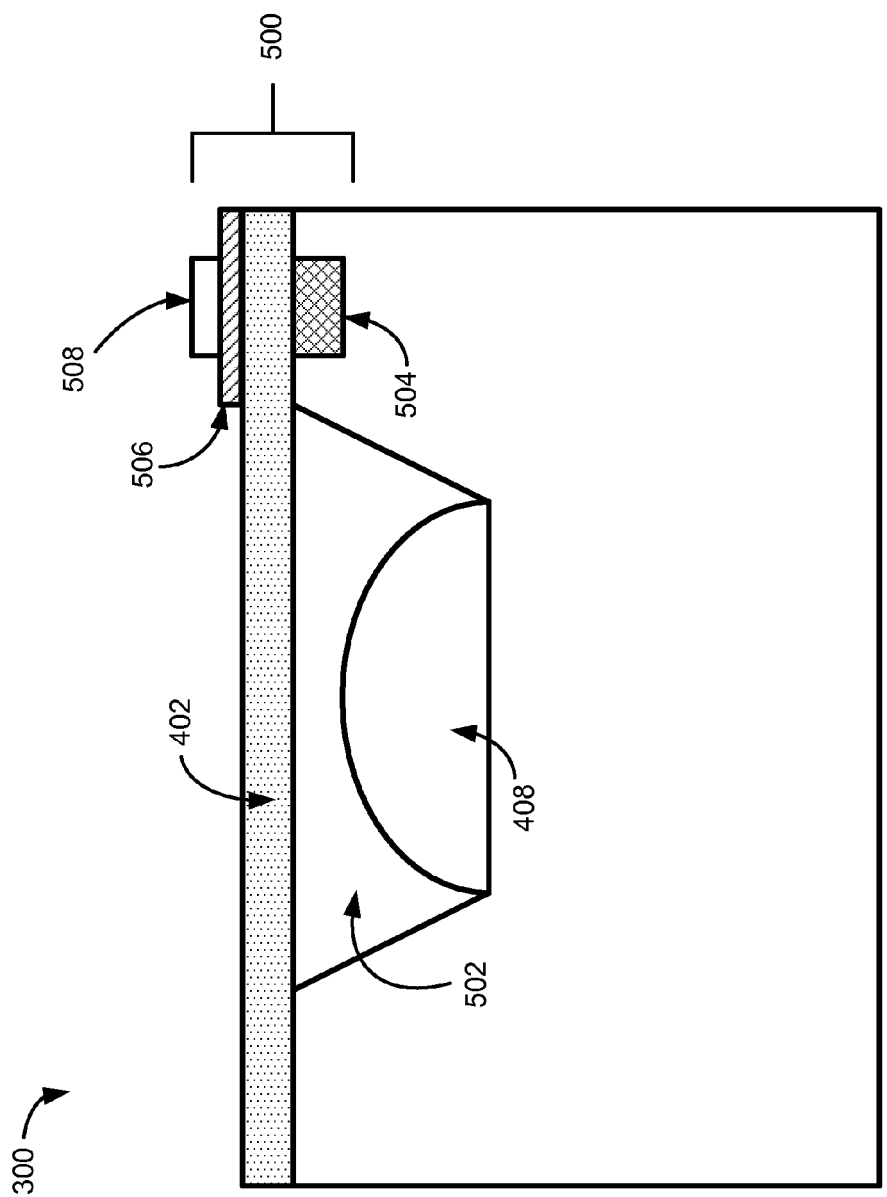
FIG. 5 illustrates a top view of a camera with an attached flat front casing and a wireless indicator, according to one example embodiment.

FIG. 5 illustrates a top view of a camera 300, according to one example embodiment. The lens 408 occupies a recessed channel 502 within the front face of the camera 300. The attached lens casing 402 covers the front face of the camera, protecting components such as the lens 408. In the embodiment of FIG. 5, the camera 300 includes a wireless indicator 500. It should be known that while only one indicator is illustrated in FIG. 5, the camera, as noted above, can include any number of indicators as indicated in, for example, the embodiment of FIG. 4.

The indicator 500 of the embodiment of FIG. 5 includes a wireless signal interface 504, a reflective layer 506, and an excitable element 508. The wireless signal interface 504 is configured to emit a wireless signal automatically or in response to a stimulus from control circuitry within the camera 300. The remainder of the description will primarily describe embodiments in which the wireless signal interface 504 emits ultra-violet ("UV") light. The UV light emitted by the wireless signal interface passes through the lens casing 402 and the reflective layer 506, and into an excitable element 508. The excitable element 508 is configured to emit visible light as visible light for display in response to receiving the UV light.

As described herein, the indicator 500 includes one of each of a wireless signal interface 504, a reflective layer 506, and an excitable element 508. It should be noted that in some embodiments, the indicator 500 can include multiple wireless signal interfaces 504 or excitable elements 508. Likewise, a wireless signal interface 504 or excitable element 508 can be used for multiple indicators 500. In addition, each indicator 500 can include a dedicated reflective layer 506, or one reflective layer 506 can be used for multiple indicators 500.

FIG. 6 provides a close-up view of the wireless indicator 500 of a camera 300, according to one example embodiment. The wireless signal interface 504 is configured to emit a wireless signal from the camera. In some embodiments, the wireless signal interface 504 is a short-wavelength (i.e., UV) invisible pump light, which is controlled by a control circuit within the camera 300. When directed to do so by the control circuit, the wireless signal interface 504 emits UV light (dashed arrows in FIG. 6) through the attached lens casing 402. As described above, the lens casing 402 can be made of any transparent or semi-transparent material that allows external light to pass through the lens casing 402 and reach the lens 408 and image sensor. In some embodiments, the lens casing 402 transmits visible light but incidentally also reflects or refracts visible light within the lens casing 402. As a result, any visible light emitted from the wireless signal interface 504 can be reflected or refracted by and within the lens casing 402 and onto the camera lens 408 for capture by the image sensor. Reflected or refracted light from the wireless signal interface 504 captured by the image sensor can result in various light artifacts or other image flaws in a captured image. UV light, however, does not appear in images when captured by an image sensor. Thus, if the wireless signal interface 504 emits UV light instead of visible light, no light artifacts or image flaws will result from incidental captured UV light After light travels from the wireless signal interface 504 through the lens casing 402, the light is then transmitted into a reflective layer 506 coupled to the lens casing 402. The reflective layer 506 is composed of any material that allows for the transmittal of UV light and reflection of visible light. In one aspect, the reflective layer 506 comprises a dielectric mirror. A dielectric mirror is coated in a material that is configured to reflect light at distinct wavelength intervals: light at a specific wavelength range is reflected, while light outside of that range is transmitted through the dielectric mirror. In another embodiment, the reflective layer 506 comprises a visible absorber (e.g., a short pass filter). A short pass filter comprises a coating that reflects light at longer wavelengths (e.g., visible light), and transmits light at shorter wavelengths (e.g., UV light). In one embodiment, the reflective layer 506 comprises a dichroic layer. The reflective layer 506 transmits the UV light from the wireless signal interface 504 into the excitable element 508.

An excitable element 508 is coupled to the reflective layer 506. The UV light that passes through the reflective layer 506 is received by the excitable element 508. The excitable element 508, in response to UV light incident upon the excitable element 508, emits visible light for display to a user. In one embodiment, the excitable element 508 comprises a phosphor layer, which can exhibit luminescence. In such an embodiment, light is absorbed by the phosphor layer, causing the phosphor to become optically excited. The phosphor then re-emits light in the visible spectral band. In a further embodiment, the phosphor layer is protected by a cover sheet. The visible light emitted by the excitable element 508 is shown as solid arrows from the excitable element 508 in FIG. 6. Any visible light emitted towards the reflective layer 506 is reflected outward and is not transmitted back through the lens casing 402. Thus, the reflective layer 506 prevents visible light emitted by the excitable element 508 from being reflected or refracted by the lens casing 502 into the lens 408, preventing the visible light emitted by the excitable element 508 from causing artifacts or image flaws in captured images.

The wireless signal interface 504 can emit light in a specific pulsation pattern to modify how the light is emitted by the excitable element 508 and how the visible light is ultimately displayed to a viewer. For example, the wireless signal interface 504 may be configured to pulse the UV light in a specific pattern over time, and the excitable element 508 is configured to display visible light based on the pattern of the received UV light. In such embodiments, the excitable element 508 may associate a variety of pre-determined UV light patterns with visible light of a particular color, shape, character, or pattern. For example, if the excitable element 508 receives three short UV light pulses, the excitable element 508 may display a blue "T", and if the excitable element receives two long UV light pulses, the excitable element 508 may display a red "4", and so forth. Thus, the wireless signal interface 504 can include a photoreceiver controller configured to identify a desired visible notification (such as a particular word, symbol, pattern, color, and the like), and can emit a UV light pattern associated with the identified visible light emission by the excitable element 508 in order to cause the excitable element 508 to display the identified light emission.

In one example, a user turns a power setting to "on" in a camera 300. The camera 300 is configured to indicate to the user that the camera 300 is on via indicator lights 404/406. Circuitry within the camera directs the wireless signal interface 504 to emit UV light in a specific pulsation pattern, which signifies that the indicator screen 404 should display the word "ON". The UV light travels from the wireless signal interface through a lens cover 402, through a dielectric mirror 506 and into a phosphor layer 508. The phosphor layer 508 becomes optically excited so that the UV light is re-emitted as visible light for display to the user, such that the visible light is presented on the indicator screen 404 as the word "ON". Any visible light emitted by the phosphor layer that is incident on the dielectric mirror is reflected back into the environment and not transmitted through the dielectric mirror. Therefore, light emitted from the wireless signal interface 504 is visible on the indicator 404 to the user, but does not cause light artifacts or image flaws in any images captured by the camera 300.

In various alternative embodiments, the wireless signal interface 504 emits non-light wireless signals, such as electromagnetic signals, audio signals, and the like. In various embodiments, the wireless signal interface 504 emits signals using the IEEE 802.11 WiFi standard, the IEEE 802.15.1 Bluetooth standard, the IEEE 802.16 WiMax standard, the LTE standard, or any other wireless standard or signal configuration. In such embodiments, the excitable element 508 can include a power converter configured to receive the wireless signals and to convert the wireless signals to power or electricity for use in producing visible light for emission. The reflective layer 506 can be composed of a solar or photovoltaic cell configured to convert light into energy. The energy produced by such a reflective layer 506 can be used by the excitable element 508 to emit visible light.

In one embodiment, the excitable element 508 can also include a microphone or other recording device and a wireless transmitter, and the wireless signal interface 504 can include a wireless receiver. In such an embodiment, the microphone can record sound external to the camera 300 and can wirelessly transmit the recorded sound through the reflective layer 506 for reception by the wireless receiver of the wireless signal interface 504. Continuing with this embodiment, the excitable element 508 can convert received UV light or other wireless signals from the wireless signal interface 504 in order to obtain energy to power the microphone and wireless transmitter. The wireless receiver of the wireless signal interface 504 can receive wireless signals from the wireless transmitter of the excitable element 508 representative of the sound captured by the microphone of the excitable element 508 for storage within the camera 300. Such an embodiment allows for the capture of audio by a camera 300 despite the presence of a waterproof exterior (made up of at least the lens cover 402) that otherwise would inhibit the ability of a microphone internal to the waterproof exterior of the camera 300 from capturing sound.

In one embodiment, the wireless signal interface 504 and the excitable element 508 can be implemented within a non-camera device, and can be configured to implement the functionalities described herein. For example, the wireless signal interface 504 and the excitable element can be located on opposite sides of a mobile phone case, a vehicle exterior, a tablet computer, and the like. Alternatively, the wireless signal interface 504 and the excitable element 508 can be implemented within a non-device while implementing the functionalities described herein. For instance, the wireless signal interface 504 and the excitable element 508 can be implemented on opposite sides of a wall, at different locations on a human body, and the like. In such embodiments, the wireless signal interface 504 is configured to broadcast a signal, the excitable element 508 is configured to receive the signal and perform a function (for instance, an electronic function powered by electricity converted from the signal), and the excitable element 508 is optionally configured to broadcast a second signal (for instance, based on the function performed by the excitable element 508) that is received by the wireless signal interface 504. In these embodiments, the wireless signals are broadcast through a barrier, for instance a camera housing, a wall, and human body, and the like.

Additional Configuration Considerations

The wireless camera illuminators described herein beneficially allow for the display of notifications by a camera within, for example, a camera housing. In conventional camera housings, emitting light from within the camera housing can cause light to refract and reflect within a transparent housing, and can result in the capture of the reflected light by the camera's image sensor, resulting in undesirable image artifacts. By displaying notifications from a wireless camera housing surface indicator coupled to a reflective surface layer, visible light produced by the indicator is reflected away from the camera, reducing the amount of incidental light produced by the indicators captured by the image sensor. Further, by receiving wireless signals such as UV light transmitted through the camera housing, the indicators can produce visible notifications without the need for a wired interface between the camera and the indicator.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera system, comprising:
   a camera comprising:
      a camera body having a camera lens structured on a front surface of the camera body;
      a wireless signal interface structured on a front surface of the camera body, the wireless signal interface configured to produce wireless control signals for an indicator;
      electronics internal to the camera body, the electronics for capturing images via the camera lens and producing wireless control signals via the wireless signal interface; and
   a camera housing configured to secure the camera in a first configuration and to allow for the insertion of the camera into or removal of the camera from the camera housing in a second configuration, the camera housing comprising:
      an enclosure structured to at least partially enclose the camera;
      a lens window structured to substantially cover the camera lens of the camera when the camera is enclosed within the enclosure; and
      an indicator structured to substantially align with the wireless signal interface when the camera is enclosed within the enclosure and configured to produce visible light in response to receiving wireless control signals from the wireless signal interface.

2. The camera system of claim 1, wherein the enclosure comprises a flat front surface configured to substantially align with the front surface of the camera body when the camera is enclosed within the enc sure, and wherein the indicator is coupled to the flat front surface of the enclosure.

3. The camera system of claim 1, wherein the indicator comprises:
   a reflective layer coupled to the enclosure and configured to substantially align with the wireless signal interface when the camera is enclosed within the enclosure, and to reflect visible light incident upon the reflective layer; and
   an excitable element coupled to the reflective layer and configured to produce visible light in response to wireless control signals transmitted through the reflective layer and incident upon the excitable element.

4. The camera system of claim 3, wherein the reflective layer comprises a dielectric minor configured to reflect light within the visible spectrum.

5. The camera system of claim 3, wherein the wireless signal interface comprises an ultra-violet (UV) lamp, and wherein the wireless control signals comprise UV light.

6. The camera system of claim 5, wherein the excitable element comprises a phosphor configured to produce visible light in response to UV light incident upon the phosphor.

7. A camera housing, comprising:
   an enclosure structured to at least partially enclose a camera, the enclosure configured to secure the camera in a first configuration and to allow for the insertion of the camera into or removal of the camera from the enclosure in a second configuration;
   a lens window structured to substantially cover the camera lens of the camera when the camera is enclosed within the enclosure;
   a reflective layer coupled to the enclosure and configured to substantially align with a wireless signal interface of the camera when the camera is enclosed within the enclosure, and to reflect visible light incident upon the reflective layer; and
   an excitable element coupled to the reflective layer and configured to produce a visible notification in response to wireless control signals transmitted through the reflective layer and incident upon the excitable element.

8. The camera housing of claim 7, wherein the reflective layer comprises a dielectric minor configured to reflect light within the visible spectrum.

9. The camera housing of claim 7, wherein the wireless signal interface comprises an ultra-violet (UV) lamp, and wherein the wireless control signals comprise UV light.

10. The camera housing of claim 7, wherein the excitable element comprises a phosphor configured to produce visible light in response to UV light incident upon the phosphor.

11. A method of producing a visible notification, comprising:
   identifying a visible notification signal for display to a camera user;
   transmitting, from a camera at least partially enclosed by a camera housing, a wireless notification signal representative of the identified visible notification signal, the camera housing configured to secure the camera in a first configuration and to allow for the insertion of the camera into or removal of the camera from the camera housing in a second configuration;
   receiving, by an indicator coupled to a camera housing side opposite the camera, the wireless notification signal; and
   producing, by the indicator, the visible notification signal in response to receiving the wireless notification signal.

12. The method of claim 11, wherein the camera housing comprises a flat front surface configured to substantially align with a front surface of the camera when the camera is enclosed within the camera housing, and wherein the indicator is coupled to the flat front surface of the camera housing.

13. The method of claim 11, wherein the indicator comprises:
   a reflective layer coupled to the camera housing and configured to reflect visible light incident upon the reflective layer; and
   an excitable element coupled to the reflective layer and configured to produce visible light in response to receiving wireless notification signals.

14. The method of claim 13, wherein the reflective layer comprises a dielectric minor configured to reflect light within the visible spectrum.

15. The method of claim 13, wherein the wireless notification signal comprises UV light.

16. The method of claim 15, wherein the excitable element comprises a phosphor configured to produce visible light in response to UV light incident upon the phosphor.

* * * * *

UNITED STATES PATENT AND TRADEMARK OFFICE
CERTIFICATE OF CORRECTION

| | | |
|---|---|---|
| PATENT NO. | : 9,030,606 B2 | Page 1 of 1 |
| APPLICATION NO. | : 13/829377 | |
| DATED | : May 12, 2015 | |
| INVENTOR(S) | : Scott Patrick Campbell | |

It is certified that error appears in the above-identified patent and that said Letters Patent is hereby corrected as shown below:

In the Claims:

Column 9, line 57, delete "within the enc sure", and insert --wherein the enclosure--.

Signed and Sealed this
Twelfth Day of April, 2016

Michelle K. Lee
*Director of the United States Patent and Trademark Office*